(12) United States Patent
Fujii et al.

(10) Patent No.: US 12,095,286 B2
(45) Date of Patent: Sep. 17, 2024

(54) POWER SUPPLY SYSTEM, POWER SUPPLY DEVICE, AND POWER SUPPLY METHOD

(71) Applicant: MINEBEA MITSUMI Inc., Nagano (JP)

(72) Inventors: Masaaki Fujii, Nagano (JP); Naoki Tsuji, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 156 days.

(21) Appl. No.: 17/759,395

(22) PCT Filed: Jan. 6, 2021

(86) PCT No.: PCT/JP2021/000213
§ 371 (c)(1),
(2) Date: Jul. 25, 2022

(87) PCT Pub. No.: WO2021/171790
PCT Pub. Date: Sep. 2, 2021

(65) Prior Publication Data
US 2023/0088273 A1    Mar. 23, 2023

(30) Foreign Application Priority Data

Feb. 27, 2020 (JP) .................... 2020-031361

(51) Int. Cl.
*H02J 50/20* (2016.01)
*H02J 50/30* (2016.01)
(Continued)

(52) U.S. Cl.
CPC ............. *H02J 50/30* (2016.02); *H02J 50/20* (2016.02); *H02J 50/402* (2020.01); *H02J 50/90* (2016.02); *H04N 23/20* (2023.01); *H04N 23/65* (2023.01)

(58) Field of Classification Search
CPC .......... H02J 50/30; H02J 50/20; H02J 50/402; H02J 50/90; H04N 23/20; H04N 23/65; H01Q 1/22; H01Q 3/36
(Continued)

(56) References Cited

U.S. PATENT DOCUMENTS

2015/0311755 A1    10/2015  Hiebl et al.
2015/0318897 A1*   11/2015  Hyde ...................... H02J 50/30
                                                    307/104
2019/0039473 A1    2/2019   Takehara et al.

FOREIGN PATENT DOCUMENTS

JP    2014-079029    5/2014
JP    2018-121489    8/2018
(Continued)

OTHER PUBLICATIONS

International Search Report for PCT/JP2021/000213 mailed on Mar. 30, 2021.
(Continued)

*Primary Examiner* — Rexford N Barnie
*Assistant Examiner* — Xuan Ly
(74) *Attorney, Agent, or Firm* — IPUSA, PLLC (57) ABSTRACT

To provide a power supply system, a power device, and a power method capable of wireless power supply with a simple configuration.
A power supply system includes a first infrared output unit provided on a first object, the first infrared output unit having a first directivity configured to output a first infrared ray in a first direction in which a second object that relatively moves with respect to the first object is situated, the first infrared output unit being configured to output the first infrared ray, a reflector provided on the second object, the reflector being configured to reflect the first infrared ray by retroreflection, a second infrared output unit provided on the second object, the second infrared output unit having a
(Continued)

second directivity configured to output a second infrared ray in a second direction in which the first object that relatively moves is situated, the second infrared output unit being configured to output the second infrared ray by using power received by wireless power supply, and a power supply provided on the first object, the power supply being configured to, in a case of receiving a reflected infrared ray of the first infrared ray reflected by the reflector or in a case of receiving the second infrared ray, output a beam in an arrival direction of the reflected infrared ray or the second infrared ray.

7 Claims, 9 Drawing Sheets

(51) Int. Cl.
*H02J 50/40* (2016.01)
*H02J 50/90* (2016.01)
*H04N 23/20* (2023.01)
*H04N 23/65* (2023.01)

(58) Field of Classification Search
USPC .......................................................... 307/104
See application file for complete search history.

(56) References Cited

FOREIGN PATENT DOCUMENTS

| | | |
|---|---|---|
| JP | 2019-126198 | 7/2019 |
| WO | 2017/134951 | 8/2017 |

OTHER PUBLICATIONS

Extended European Search Report mailed on Mar. 3, 2023 with respect to the European patent application No. 21761119.3.

Fujii Masaaki et al. "Phased Array Directivity Control Based on Equidistance Projection Time Series in Microwave Power Transfer for Mobile Monitoring", 2019 2nd International Conference on Communication Engineering and Technology (ICCET), IEEE, Apr. 12, 2019 (Apr. 12, 2019), pp. 107-111, XP033556657, DOI: 10.1109/ICCET.2019.8726909.

* cited by examiner

POWER SUPPLY SYSTEM, POWER SUPPLY DEVICE, AND POWER SUPPLY METHOD

TECHNICAL FIELD

The present invention relates to a power supply system, a power device, and a power method.

BACKGROUND

In conventional contactless power transmission systems, a vehicle causes a light emitting device to blink and transmits blink period information to a power transmission device when positioning with the power transmission device. In a power transmission device, for example, a controller recognizes the blinking period of the light emitting device according to an image captured by an imaging device, and in a case where the blinking period indicated by the blinking period information received by a communication device and the blinking period recognized according to the captured image are the same, the vehicle of which the image is captured by the imaging device is associated with the vehicle that has transmitted the blinking period information indicating the blinking period recognized from the captured image (for example, see PTL1).

CITATION LIST

Patent Literature

[PTL1] Japanese Laid-Open Patent Publication No. 2018-121489

SUMMARY

Technical Problem

Because conventional contactless power transmission systems determine whether the blinking period indicated by the blinking period information received by the communication device and the blinking period recognized according to the captured image are the same, the conventional contactless power transmission systems have complicated configurations.

Accordingly, it is an object to provide a power supply system, a power device, and a power method capable of wireless power supply with a simple configuration.

Solution to Problem

A power supply system according to an embodiment of the present invention includes a first infrared output unit provided on a first object, the first infrared output unit having a first directivity configured to output a first infrared ray in a first direction in which a second object that relatively moves with respect to the first object is situated, the first infrared output unit being configured to output the first infrared ray, a reflector provided on the second object, the reflector being configured to reflect the first infrared ray by retroreflection, a second infrared output unit provided on the second object, the second infrared output unit having a second directivity configured to output a second infrared ray in a second direction in which the first object that relatively moves is situated, the second infrared output unit being configured to output the second infrared ray by using power received by wireless power supply, and a power supply provided on the first object, the power supply being configured to, in a case of receiving a reflected infrared ray of the first infrared ray reflected by the reflector or in a case of receiving the second infrared ray, output a beam in an arrival direction of the reflected infrared ray or the second infrared ray.

Advantageous Effects of Invention

A power supply system, a power device, and a power method capable of wireless power supply with a simple configuration can be provided.

DESCRIPTION OF EMBODIMENTS

Hereinafter, an embodiment to which a power supply system, a power device, and a power method according to the present invention are applied are explained below.

EMBODIMENT

Before the power supply system and the power method according to the embodiment is explained, the power device 100 according to the embodiment will be described with reference to FIG. 1 and FIG. 2.

Figure 1:
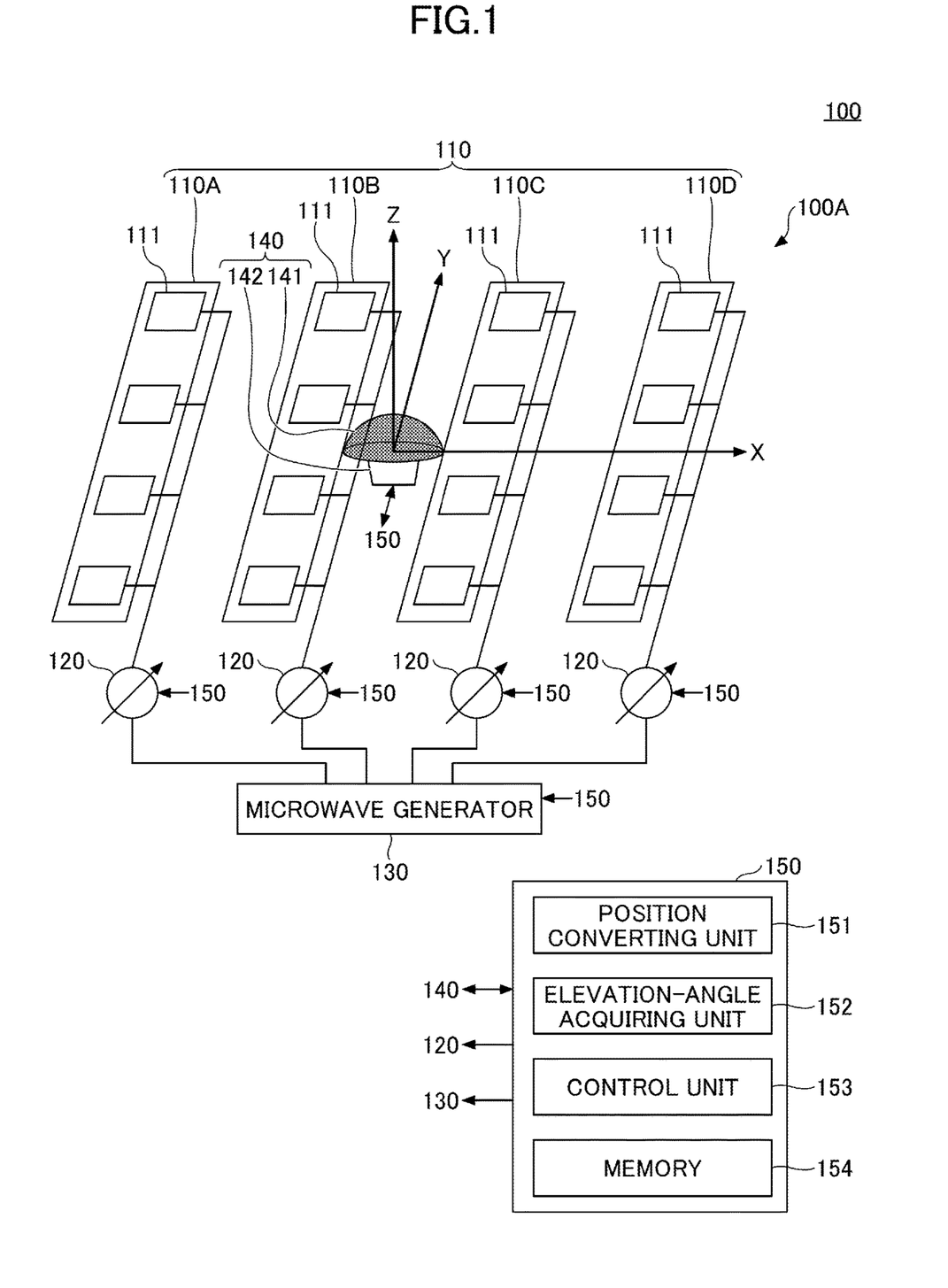
FIG. 1 is a diagram illustrating a power device according to an embodiment.
Figure 2:
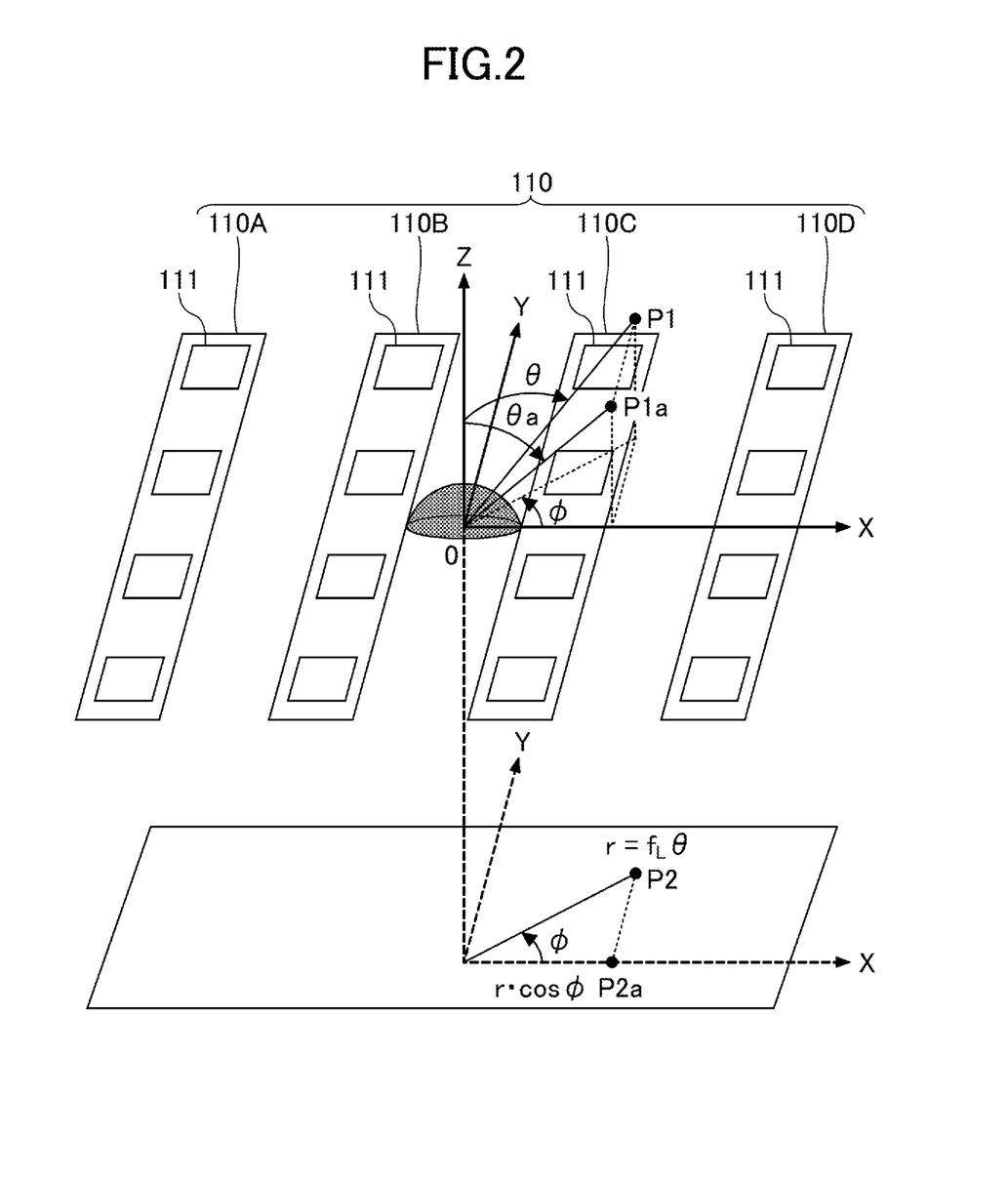
FIG. 2 is a diagram illustrating a polar coordinate system used in an array antenna.

FIG. 1 is a diagram illustrating a power device 100 according to an embodiment. The power device 100 includes an array antenna 110, phase shifters 120, a microwave generator 130, a camera 140, and a controller 150.

In the following description, an XYZ coordinate system is used. A plan view means a view seen from an XY plane. An X-axis is an example of a first axis, a Y-axis is an example of a second axis, and a Z-axis is an example of a third axis. The XY plane is an example of a first plane, and an XZ plane is an example of a second plane.

As an example, the array antenna 110 includes a group of four subarrays 110A, 110B, 110C, and 110D. The subarrays 110A to 110D are ranged in an X-axis direction, and each of the subarrays 110A to 110D may include four antenna elements 111, for example. In this case, for example, the array antenna 110 includes sixteen antenna elements 111. Each antenna element 111 is a rectangular patch antenna in a plan view. The array antenna 110 may have a ground plate that is set at a ground potential and that is on the −Z direction side of the antenna elements 111. Note that for example, a center determined based on positions of the sixteen antenna elements 111 coincides with the origin of the XYZ coordinate system.

Four phase shifters 120 are respectively provided for the four subarrays 110A to 110D, and each of the four phase shifters 120 is connected to given antenna elements 111 of a corresponding subarray among the subarrays 110A to 110D. In each of the subarrays 110A to 110D, four antenna elements 111 are connected in parallel to a corresponding one phase shifter 120.

Each phase shifter 120 is an example of a phase adjusting unit.

In each of the subarrays 110A to 110D, power having the same phase is supplied to each of the four antenna elements 111. Also, power output from the four phase shifters 120 to the subarrays 110A to 110D differs from each other in phase. Thus, an angle (elevation angle) of a beam formed by radio waves radiated from the sixteen antenna elements 111 can be adjusted within the XZ plane. Further, the beam has a narrow directivity, and the directivity is, for example, from about 5 degrees to about 15 degrees.

A beam output from the array antenna 110 is as explained in the beam formed by the radio waves radiated from the sixteen antenna elements 111. Also, a beam output from each of the power device 100 is as explained in the beam output from the array antenna 110.

The microwave generator 130 is connected to each of the four phase shifters 120 and supplies microwaves of predetermined power. The microwave generator 130 is an example of an electromagnetic wave generator. For example, a microwave frequency is 915 MHz. Note that in this description, the power device 100 has the configuration that includes the microwave generator 130. However, the microwave is not limiting, and a radio wave of a predetermined frequency may be used.

The camera 140 is disposed between the subarray 110B and the subarray 110C. The camera 140 includes a fisheye lens 141 and a camera body 142. The camera 140 is an example of an image capturing unit.

The fisheye lens 141 is a lens employing an equidistant projection. For example, the center of the fisheye lens 141 coincides with each of the above center determined from the sixteen antenna elements 111 and the origin of the XYZ coordinate system. The camera body 142 is a portion of the camera 140 other than the fisheye lens 141. The camera may be any camera capable of receiving infrared rays of a predetermined wavelength. The predetermined wavelength is, for example, 850 nm, but may be a wavelength other than 850 nm.

The camera 140 capable of receiving infrared rays of 850 nm is, for example, an infrared camera having a filter transmitting a wavelength of 850 nm or a CMOS (Complementary Metal Oxide Semiconductor) image sensor having a filter capable of receiving infrared rays and capable of transmitting a wavelength of 850 nm.

The camera 140 captures an image with a marker, through the fisheye lens 141, and outputs image data to the controller 150. The marker is attached to a target, to which the power device 100 outputs a beam. The power device 100 determines a position of the marker included in a given image captured by the camera 140, and then irradiates the target with a beam.

The controller 150 includes a position converting unit 151, an elevation-angle acquiring unit 152, a control unit 153, and a memory 154. The controller 150 is implemented by a computer including a central processing unit (CPU) and a memory. The position converting unit 151, the elevation-angle acquiring unit 152, and the control unit 153, which are functionally implemented by a program that the controller 150 executes, are illustrated using respective functional blocks. The memory 154, which is a memory of the controller 150, is functionally illustrated.

Hereafter, the position converting unit 151, the elevation-angle acquiring unit 152, the control unit 153, and the memory 154 will be explained with reference to FIG. 2 together with FIG. 1. FIG. 2 is a diagram illustrating a polar coordinate system used in the array antenna 110. In FIG. 2, only the array antenna 110 and the camera 140 of the power device 100 are illustrated. Also, in FIG. 2, the polar coordinate system in a plane parallel to the XY plane is illustrated.

Moreover, a position of the marker in the XYZ coordinate system is expressed by P1, an elevation angle associated with a line segment connecting the origin O and the position P1 is expressed by $\theta$, and an azimuth angle is expressed by $\varphi$. The elevation angle is an angle from the +Z direction, the azimuth angle is an angle from the +X direction, and a counterclockwise direction in a plan view is expressed using a positive value. An elevation angle associated with a line segment connecting a position P1a, which is obtained by projecting the position P1 onto the XZ plane, and the origin O, is expressed by $\theta a$.

The position P1 is an example of a first position, and the position P1a is an example of a projected position. The origin O is an example of a reference point in the XYZ coordinate system.

The power device 100 adjusts, within only the XZ plane, a given elevation angle of a beam that the array antenna 110 outputs. In this regard, it is assumed that a given position of the target is not greatly displaced from the XZ plane (e.g., the given elevation angle from the Z-axis, within the YZ plane, is approximately within the range of ±30 degrees, inclusive). This is because when the given target is at such a position, the beam can be projected onto the given target by simply adjusting the elevation angle of the beam within the XZ plane.

The position converting unit 151 performs image processing with respect to an image captured by the camera 140, to thereby convert coordinates of the image to which an equidistant projection is applied and that is obtained through the fisheye lens 141, into polar coordinates on a plane parallel to the XY plane. By the image processing, the position P1, which is used in the array antenna 110, of the marker included in the image captured by the camera 140 is converted into a position P2 expressed in polar coordinates on the XY plane. The position P2 is an example of a second position.

The position P2 is expressed with a radius r from the origin O, and a deflection angle $\varphi$. When a focal length of the fisheye lens 141 is given as $f_L$, the radius r is expressed by $r = f_L \theta$. The deflection angle $\varphi$ is identical to the azimuth angle $\varphi$. The position converting unit 151 calculates $r \cdot \cos \varphi$ indicating that the radius r is mapped to the X-axis, by the above-explained image processing.

The elevation-angle acquiring unit 152 acquires (determines), as the elevation angle $\theta a$, a value ($r \cdot \cos \varphi / f_L$) obtained by dividing an X-coordinate ($r \cdot \cos \varphi$) of a mapped position P2a, by the focal length $f_L$ of the fisheye lens 141, where the mapped position P2a is obtained by mapping the position P2 to the X-axis. The reason why the elevation angle $\theta a$ can be obtained in such a manner will be explained below.

The control unit 153 controls the phase shifters 120 such that a given direction of the beam emitted from the array antenna 110 is derived from the elevation angle θa within the XZ plane. The elevation angle θa is obtained by the elevation-angle acquiring unit 152. The control unit 153 performs an output control of the microwave generator 130, an imaging control of the camera 140, and the like.

The memory 154 stores a program to be executed when the position converting unit 151, the elevation-angle acquiring unit 152, and the control unit 153 perform processing. The memory 154 stores data such as data to be used when the program is executed, data that is to be generated when the program is executed, and image data acquired by the camera 140.

Hereafter, a method for determining the elevation angle θa will be explained.

When the azimuth angle φ and the elevation angle θ are used, the elevation angle θa can be determined, as expressed by Equation (1) below, by taking into account the geometric relationship between the position P1 and the position P1a.

[Math 1]

$$\theta a = \frac{\pi}{2} - \tan^{-1}\left\{\frac{1}{\cos\phi}\tan\left(\frac{\pi}{2} - \theta\right)\right\} \quad (1)$$

When Equation (1) is expanded, Equation (2) is obtained.

[Math 2]

$$\tan \theta a = \cos \phi \tan \theta \quad (2)$$

Here, if the elevation angle θ is sufficiently small, "tan θ≈θ" is satisfied; if the azimuth angle φ is sufficiently small, "cos φ≈1" is satisfied; and, if the azimuth angle φ is close to 90 degrees, "cos φ≈0" is satisfied, accordingly, then Equation (2) can be transformed into Equation (3).

[Math 3]

$$\theta a = \theta \cos \phi \quad (3)$$

In other words, if the position of a given target is not displaced greatly from the XZ plane, the elevation angle θa can be approximated as expressed by Equation (3).

Further, as explained above, when the focal length $f_L$ of the fisheye lens 141 is given as $f_L$, the radius r is expressed by Equation (4) below.

$$r = f_L \theta \quad (4)$$

From Equation (3) and Equation (4), the elevation angle θa can be expressed by Equation (5) below.

$$\theta a = r \cdot \cos \phi / f_L \quad (5)$$

Thus, the elevation angle θa can be approximated using Equation (5).

As explained above, when a given elevation angle of the beam from the array antenna 110 is adjusted within only the XZ plane, the position P2 is calculated by converting coordinates of the position P1, which are obtained by an equidistance projection, into polar coordinates on a plane parallel to the XY plane, and further, an X-coordinate (r·cos φ) of a given protected position P2a is divided by the focal length $f_L$ of the fisheye lens 141, where the given projected position P2a is obtained by mapping the position P2 to the X axis. Thus, the elevation angle θa (=r·cos φ/$f_L$) can be determined.

Figure 3:
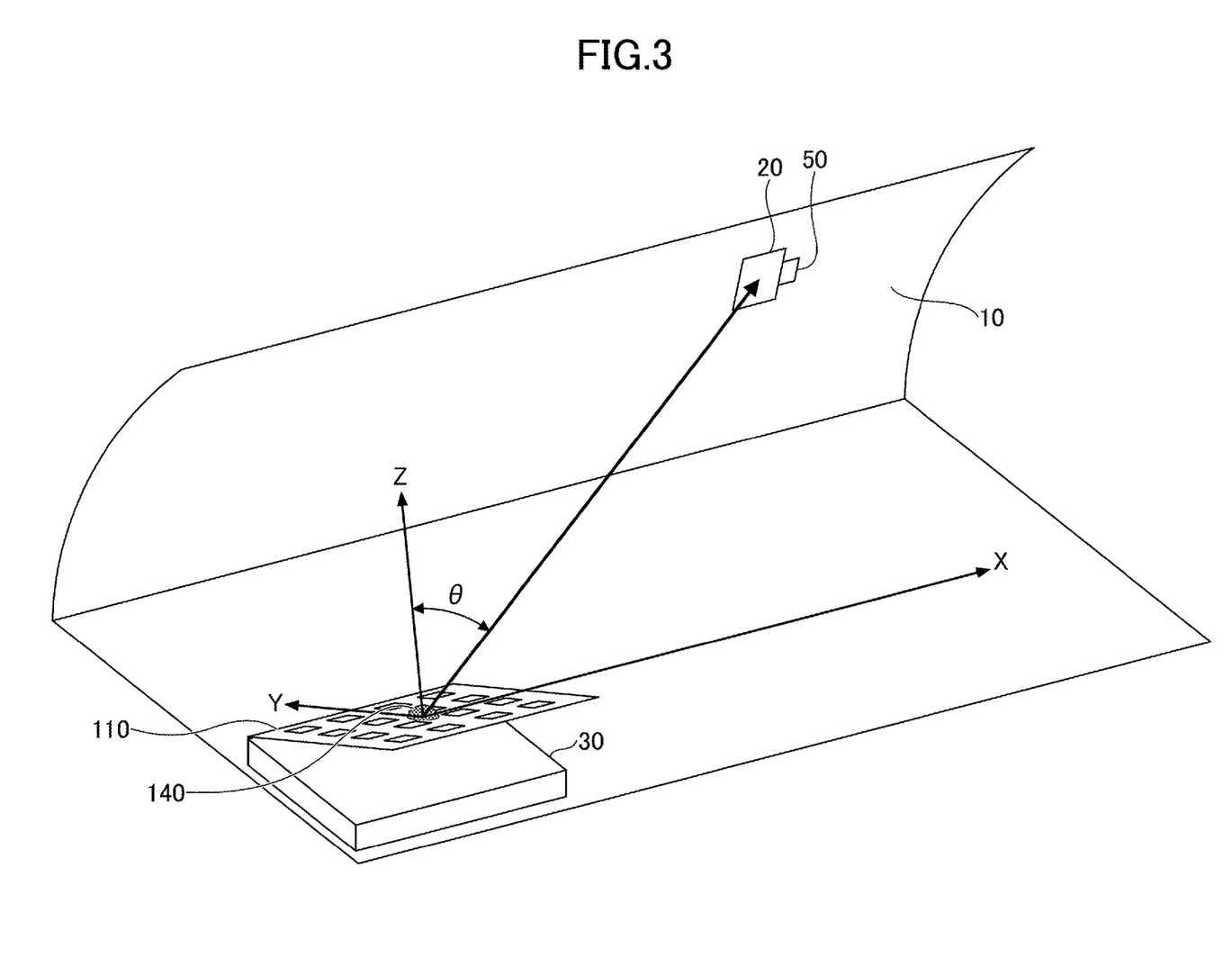
FIG. 3 is a diagram illustrating an example of how the power device is applied.

FIG. 3 is a diagram illustrating an example of how the power device 100 is applied. For example, the power device 100 is provided in a vehicle 30, and a target antenna 20 is provided on an inner wall 10 of a tunnel. A marker 50 is connected to the antenna 20. The marker 50 includes reflectors which reflect infrared rays by retroreflection. The vehicle 30 is an example of the first object, and the inner wall 10 of the tunnel is an example of the second object. When the vehicle 30 travels in the +X direction, the vehicle 30 and the inner wall 10 of the tunnel move relatively, so that the vehicle 30 and the marker 50 also move relatively. The relative moving direction of the marker 50 with respect to the power device 100 mounted on the vehicle 30 is the −X direction. Hereinafter, a case where the vehicle 30 moves so as to relatively overtake the marker 50 is explained. In this explanation, the marker 50 is assumed to be at a stop, but the overtaking means that the vehicle 30 passes another vehicle from behind and goes ahead of the another vehicle when the another vehicle is at a stop or when the another vehicle is traveling in the same direction.

When the vehicle 30 travels in the +X direction, the camera 140 is used to convert coordinates of a position of the marker 50 into polar coordinates in a plane parallel to an XY plane, and then a beam is delivered to the antenna 20 by using a given elevation angle θa (=r·cos φ/$f_L$), which is determined by dividing an X-coordinate (r·cos φ) of a mapped position (mapped position corresponding to P2a), by the focal length $f_L$ of the fisheye lens 141, where the mapped position is obtained by mapping the position of the polar coordinates onto the X-axis.

For example, the antenna 20, a sensor for monitoring looseness of a bolt and the like of a fixing part, a rectenna, a capacitor, and a wireless communication module are provided on a fixing portion for fixing, to the inner wall 10 of the tunnel, an infrastructural object, such as a jet fan or a sign, attached to the inner wall 10, and when the power device 100 radiates a beam to the antenna 20 while the vehicle 30 is traveling, the rectenna connected to the antenna 20 converts microwaves into electric power. The power converted by the rectenna is stored in a capacitor and energizes the marker, the sensor, and the wireless communication module. Then, the marker performs a predetermined operation, the wireless communication module transmits a signal indicating the output of the sensor, and the signal is received by the vehicle 30, whereby the fixing state of the infrastructural object can be inspected while traveling. The sensor for monitoring looseness of a bolt and the like of a fixing part is, for example, incorporated in a washer and fastened together with the bolt to detect the looseness of the bolt. A predetermined operation of the marker is explained later.

Also, a given X-coordinate (r·cos φ) of a given mapped position (mapped position corresponding to P2a) is determined by mapping a given position of the antenna 20, which is shifted from the XZ plane, to the X-axis, and then a beam is adjusted by using a given value (r·cos φ/$f_L$) obtained by dividing the given X-coordinate (r·cos φ) by the focal length $f_L$ of the fisheye lens 141, where the given value (r·cos φ/$f_L$) is used as a given elevation angle θa. Thus, even when the vehicle 30 traveling in the X-axis direction shifts toward either a positive side or negative side of the Y-axis, displacement due to the shift is reduced, thereby enabling the given elevation angle θa to be determined.

Figure 4:
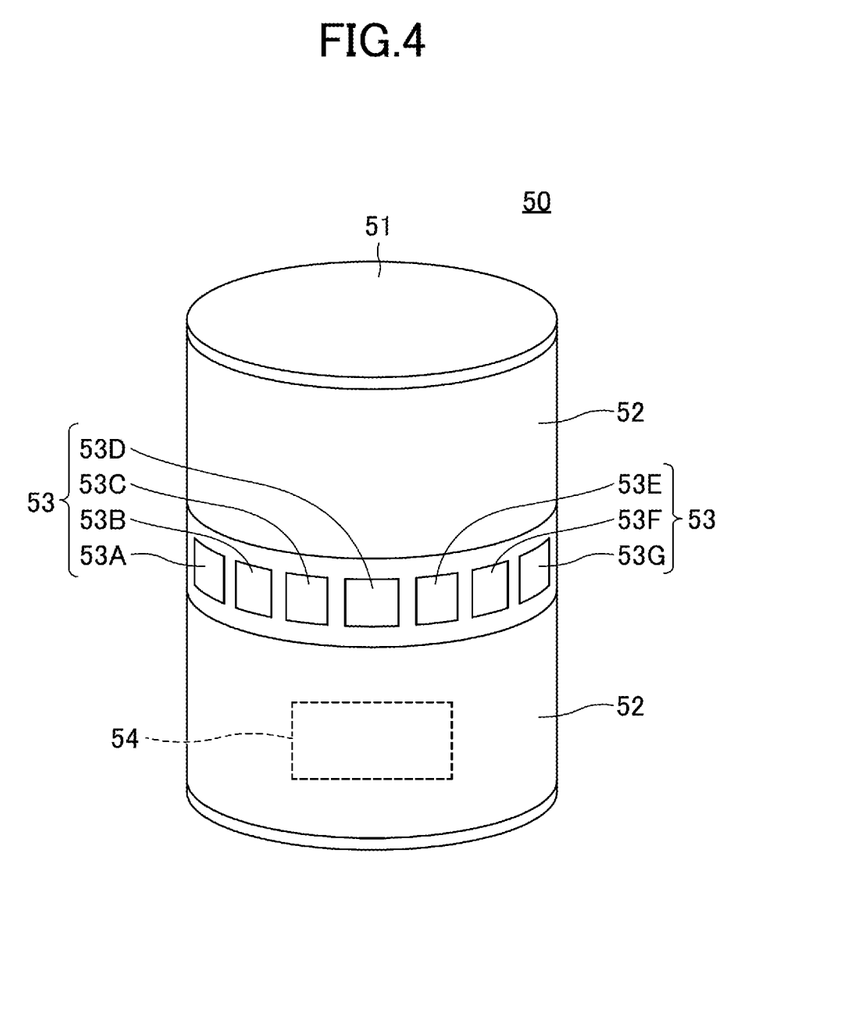
FIG. 4 is a diagram illustrating a marker.

Hereinafter, the marker 50 is explained in detail with reference to FIG. 4. FIG. 4 is a diagram illustrating the marker 50. The marker 50 includes a housing 51, reflectors 52, LEDs 53 (53A to 53G), and a control unit 54. The housing 51 is a cylindrical case. Two reflectors 52 and multiple LEDs 53 (53A to 53G) are exposed from the outer circumferential surface of the housing 51. The control unit 54 is provided inside the housing 51.

The marker 50 is, for example, mounted at a predetermined position on the inner wall 10 of the tunnel (see FIG. 3). For example, the predetermined position is a predetermined position in a cross section obtained by cutting the tunnel on a plane perpendicular to the traveling direction, and is a position at a predetermined height on the left side of the inner wall 10 with respect to the traveling direction. When the markers 50 are attached at regular intervals along the tunnel, the markers 50 appear repeatedly in the upper left front side in the traveling direction of the vehicle 30 in the case where the vehicle 30 travels through the tunnel.

The reflectors 52 are reflectors that reflect infrared rays in retroreflection, and are provided on the upper and lower sides of the outer circumferential surface of the housing 51. The reflectors 52 are retroreflectors which reflect incident infrared rays along the incident direction, and is, for example, a film type or a reflector type. The direction in which the reflectors 52 reflect rays is substantially equal to the incident direction of infrared rays.

The multiple LEDs 53 (53A to 53G) are provided along the circumferential direction on the outer circumferential surface of the housing 51 between the upper reflector 52 and the lower reflector 52, and are infrared LEDs that output infrared rays having a wavelength of 850 nm. The LEDs 53 are an example of a second infrared output unit, and the infrared rays that are output by the LEDs 53 (53A to 53G) are an example of a second infrared ray.

Since the marker 50 is attached to, for example, the inner wall 10 of the tunnel (see FIG. 3), the multiple LEDs 53 (53A to 53G) may be provided on, for example, a semi-circumferential portion that is not situated on the side of the inner wall 10 of the tunnel (i.e., a portion visible in FIG. 4). That is, as illustrated in FIG. 4, the multiple LEDs 53 are provided on the proximal-side semi-circumferential portion of the outer circumferential surface, and, for example, seven LEDs 53A to 53G are illustrated. Hereinafter, the LEDs 53A to 53G are referred to as simply as LEDs 53 when they are not particularly distinguished from each other.

The LED 53 has a directivity configured to output infrared rays with a narrow angle. The directivity of the LEDs 53 is, for example, from about 10 degrees to about 20 degrees. The lighting states of the LEDs 53 are controlled by the control unit 54. The LEDs 53A to 53G are arranged in such an order that the LED 53A is situated on the leftmost side when viewed from a vantage point facing them and the LED 53G is situated on the rightmost side when viewed from the vantage point facing them.

The control unit 54 is energized by the power received by the antenna 20 and stored in the capacitor, and sequentially turns on the LEDs 53A to 53G one by one by using the power stored in the capacitor. The order of lighting is an order from the LED 53A to the LED 53G. This is because, when the vehicle 30 approaches the marker 50, the LED 53A is turned on first so that the infrared rays that are output by the LEDs 53 are emitted to the camera 140 of the power device 100 mounted on the vehicle 30.

It should be noted that, by providing a rectenna in the direction of directivity of each LED 53, an LED 53 connected to a rectenna irradiated with microwaves may be turned on. As the vehicle 30 moves, the LEDs 56 at the optimum positions are sequentially turned on in accordance with a relative change in angle between the vehicle 30 and the marker 50, so that there is no need to perform special control for setting the directivity direction of the LEDs 53, which can simplify the design.

Figure 5:
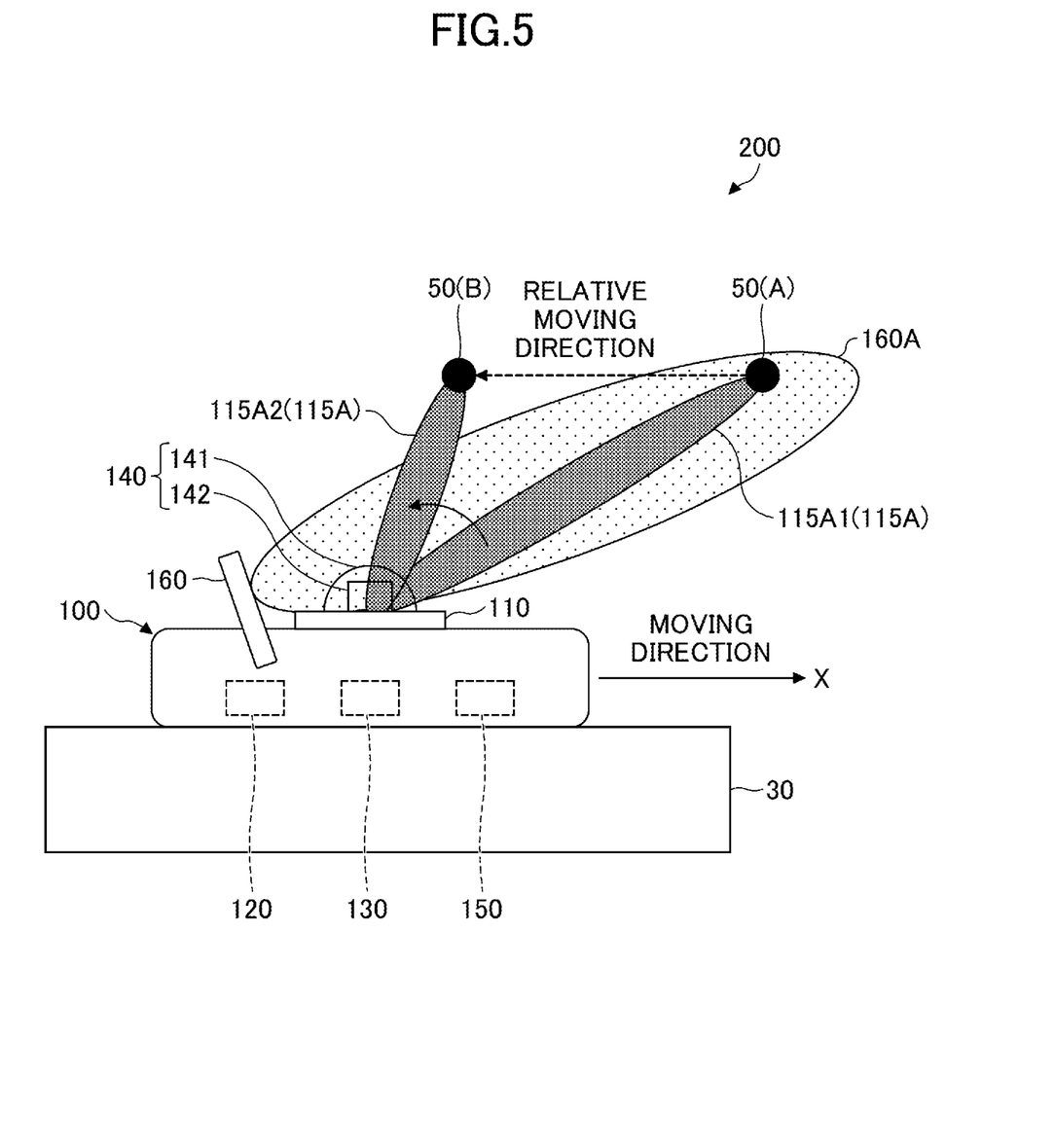
FIG. 5 is a diagram illustrating an example of an operation of the power supply system.

Next, a power supply system 200 including the power device 100 is explained. FIG. 5 is a diagram illustrating an example of an operation of the power supply system 200. FIG. 5 illustrates a positional relationship between the power supply system 200 and the marker 50 as seen from the right side in the moving direction of the vehicle 30. Therefore, in FIG. 5, the right direction is the +X direction. The markers 50 (A) and 50 (B) indicate markers 50 at positions (A) and (B), respectively, with respect to the vehicle 30. The relative moving direction of the marker 50 is the −X direction.

The power supply system 200 includes a power device 100 and a marker 50. The marker 50 is fixed to the inner wall 10 of the tunnel, and the power device 100 is mounted on the vehicle 30. In addition to the components illustrated in FIGS. 1 and 2, the power device 100 further includes an infrared output unit 160.

The infrared output unit 160 is, for example, an infrared projector that outputs infrared light having a wavelength of 850 nm. The infrared output unit 160 is provided in proximity to the array antenna 110 and has a directivity of about 10 degrees to about 20 degrees, for example. The directivity of the infrared output unit 160 is an example of a first directivity, and the infrared output unit 160 irradiates an irradiation range 160A with infrared rays. The irradiation range 160A is obtained with the directivity of the infrared output unit 160, and faces upper left front side where the markers 50 appear in the tunnel as the vehicle 30 travels. The direction in which the irradiation range 160A faces is the direction in which the markers 50 appear when the vehicle 30 travels through the tunnel.

FIG. 5 illustrates beams 115A (115A1, 115A2) that are output from the array antenna 110. The directivity of the beams 115A (115A1, 115A2) is from about 5 degrees to about 15 degrees. The beam 115A of the array antenna 110 can be oriented toward a position indicated as the beam 115A1 or toward a direction indicated as the beam 115A2.

As illustrated in FIG. 5, the vehicle 30 travels while the infrared output unit 160 irradiates the irradiation range 160A with infrared rays, and when the marker 50 at the position (A) enters the irradiation range 160A, the reflector 52 of the marker 50 reflects infrared rays in the incident direction by retroreflection.

In the power device 100, the camera 140 receives reflected light, the position converting unit 151 performs image processing and conversion to polar coordinates, an elevation-angle acquiring unit 152 acquires an elevation angle θa corresponding to the position (A), the control unit 153 controls the phase shifters 120, and the array antenna 110 outputs a beam in the direction of the elevation angle θa. Thus, the beam 115A1 is output to the marker 50 at the position (A), and the antenna 20 in proximity to the marker 50 receives power.

The vehicle 30 is moving and the position of the marker 50 with respect to the vehicle 30 relatively moves from the position (A) to the position (B). The marker 50 outputs infrared rays from the LED 53A at the relative position (B) with respect to the vehicle 30. The LED 53A has the directivity to output infrared rays in the direction in which the vehicle 30 can receive infrared rays from the LED 53A when the LED 53A outputs infrared rays at the position (B) after the antenna 20 receives power at the position (A) in a case where the vehicle 30 travels in the tunnel at a predetermined speed.

When the camera 140 of the power device 100 receives infrared rays that are output from the LED 53A at the position (B), the position converting unit 151 performs image processing and conversion to polar coordinates, the elevation-angle acquiring unit 152 acquires an elevation angle θa corresponding to the position (B), the control unit 153 controls the phase shifters 120, and the array antenna 110 outputs a beam in the direction of the elevation angle θa. As a result, the beam 115 A2 is output to the marker 50 at the position (B), and the antenna 20 in proximity to the marker 50 receives power.

Thereafter, each time the vehicle 30 travels further and the antenna 20 receives power, the marker 50 sequentially causes the LEDs 53B to 53G to output infrared rays using the power stored in the capacitor. When the power device 100 receives infrared light from the LEDs 53B to 53G, the power device 100 identifies the position of the marker 50 and outputs a beam 115A toward the marker 50.

The direction of the directivity of the LEDs 53B is shifted from the direction of the directivity of the LEDs 53A by an angle between the positions A and B as seen from the power device 100, and similarly, the directions of the directivities of the LEDs 53C to 53G are sequentially shifted from the direction of the directivity of the LED 53B by the angle between the positions A and B.

The narrow directivity of the LEDs 53A to 53G is set such that the irradiation ranges of the infrared rays of the LEDs 53A to 53G do not overlap with each other within the range of the distance where the vehicle 30 is located with respect to the marker 50.

The output of the beam 115A by the power device 100 and the output of the infrared rays from the LEDs 53 by the marker 50 are performed until the power device 100 no longer receives infrared rays from the LEDs 53 when the power device 100 outputs the beam 115A in response to receiving infrared rays from the LED 53G.

Figure 6:
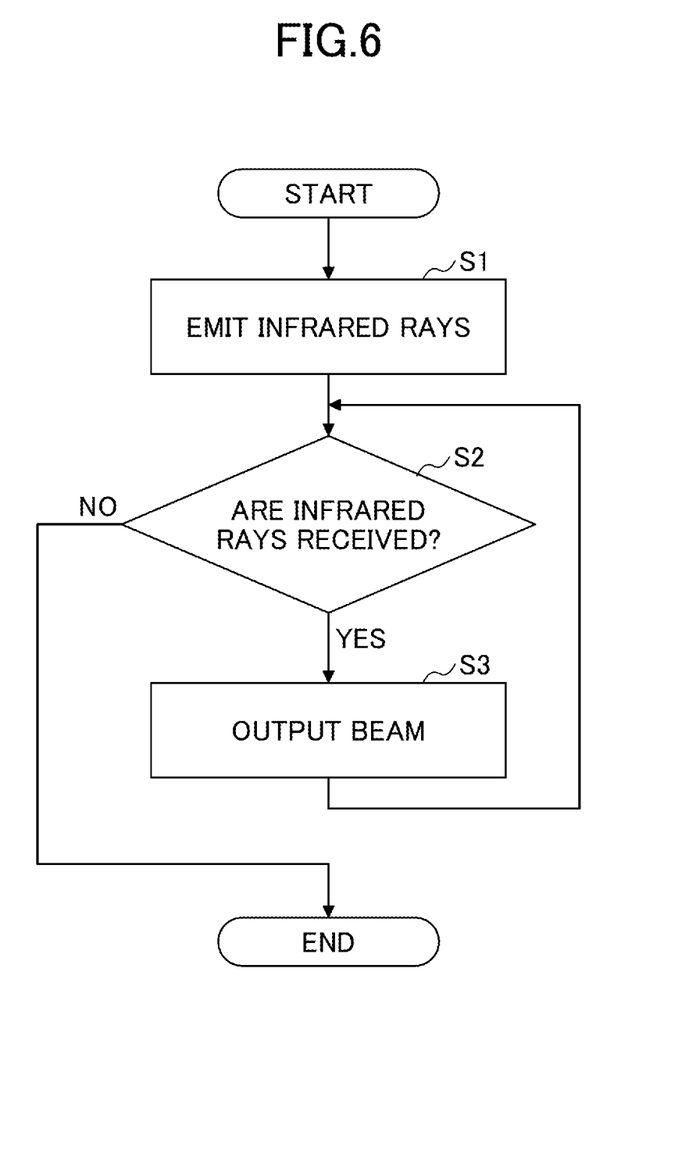
FIG. 6 is a diagram illustrating processing executed by a control unit of an electric device.

FIG. 6 is a diagram illustrating processing executed by the control unit 153 of the power device 100. The processing illustrated in FIG. 6 indicates processing of the power method according to the embodiment.

When the processing starts, the control unit 153 outputs infrared rays from the infrared output unit 160 (step S1).

The control unit 153 determines whether infrared rays are received from the marker 50 (step S2). The first infrared rays received by the power device 100 from the marker 50 are reflected light of infrared rays that are output from the infrared output unit 160, and second and subsequent infrared rays are infrared rays that are output from the LEDs 53 of the marker 50.

When the control unit 153 determines that the infrared ray has been received (S2: YES), the control unit 153 causes the array antenna 110 to output the beam 115A (step S3). More specifically, the position converting unit 151 performs image processing and conversion to polar coordinates, the elevation-angle acquiring unit 152 acquires an elevation angle θa corresponding to the position (B), the control unit 153 controls the phase shifter 120, and the array antenna 110 outputs a beam in the direction of the elevation angle θa.

When the processing of step S3 is completed, the control unit 153 returns the flow to step S2.

If the control unit 153 determines in step S2 that the infrared rays are not received (S2: NO), the control unit 153 ends the series of processes (end). The processing is ended when, for example, the power device 100 receives infrared rays from the LED 53G and outputs the beam 115A, and the power device 100 does not receive infrared rays from the LEDs 53, or when the power device 100 receives infrared rays reflected by an object other than the marker 50.

Figure 7:
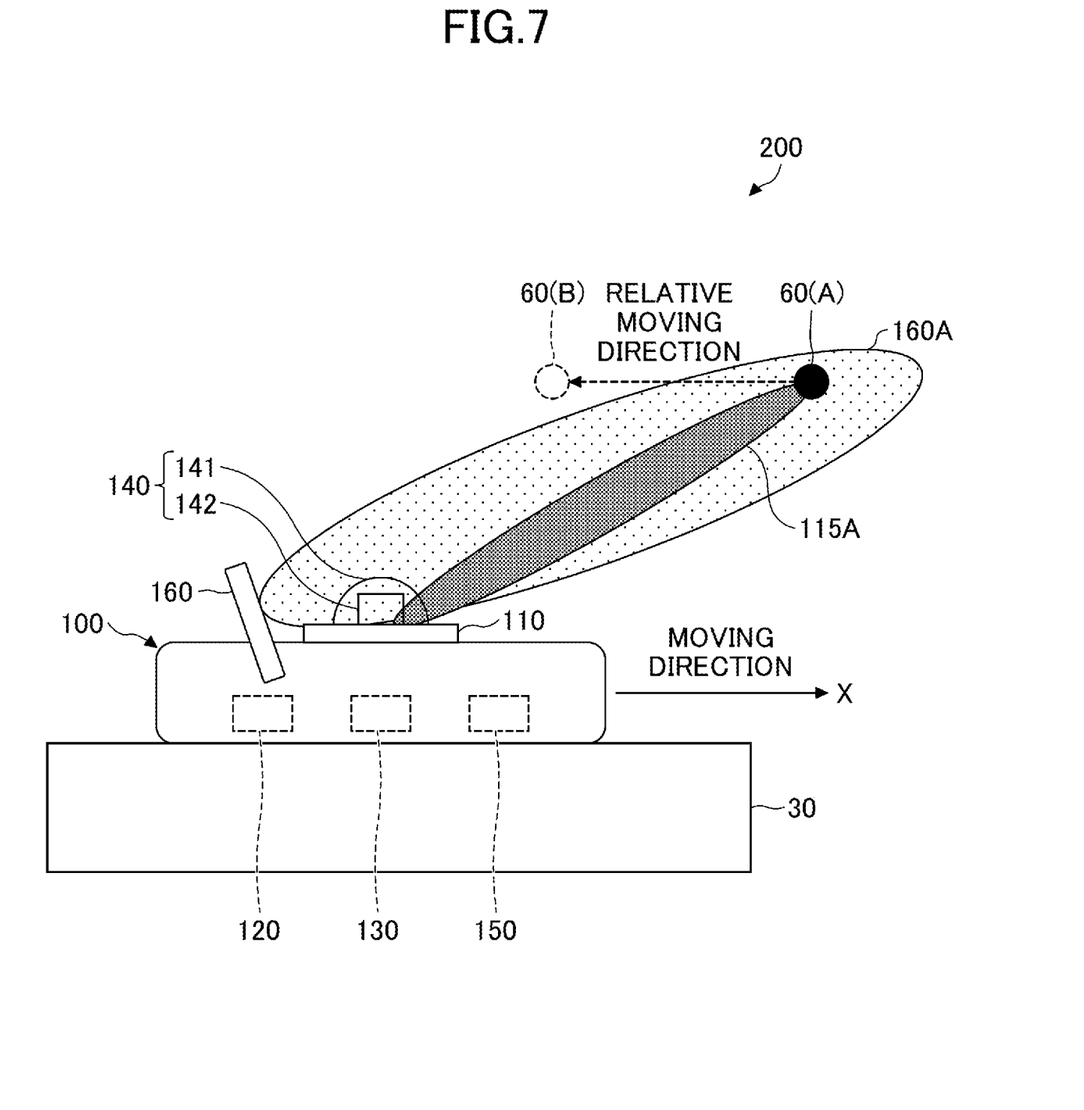
FIG. 7 is a diagram illustrating an operation in a case where the power device receives infrared rays reflected by an object other than a marker.

FIG. 7 is a diagram illustrating an operation in the case where the power device 100 receives infrared rays reflected by an object 60 other than the marker 50. In FIG. 6, the objects 60 (A) and 60 (B) indicate objects 60 at the positions (A) and (B), respectively, with respect to the vehicle 30.

As illustrated in FIG. 7, it is assumed that the vehicle 30 travels while the infrared output unit 160 irradiates the irradiation range 160A with infrared rays, the object 60 at the position (A) enters the irradiation range 160A, and the infrared rays reflected by the object 60 are received by the camera 140. The object 60 is an object other than the marker 50, and is an object facing the vehicle 30 at the position (A) or a retroreflector provided on the inner wall 10 of the tunnel.

In the power device 100, the camera 140 receives reflected light, the position converting unit 151 performs image processing and conversion to polar coordinates, the elevation-angle acquiring unit 152 acquires the elevation angle θa corresponding to the position (A), the control unit 153 controls the phase shifters 120, and the array antenna 110 outputs a beam in the direction of the elevation angle θa. Thereby, the beam 115A1 is output toward the object 60 at the position (A).

The vehicle 30 is traveling, and the position of the marker 50 with respect to the vehicle 30 relatively moves from the position (A) to the position (B).

However, the object 60 is not connected to a component, such the antenna 20, capable of receiving power, does not include a component, such the antenna 20, capable of receiving power, and does not include the LED 53, and therefore, the power device 100 does not receive infrared rays from the object 60 at the position (B).

As a result, the power device 100 ends the processing. In the flowchart illustrated in FIG. 6, this corresponds to a pattern in which the infrared rays are emitted in step S1, "YES" is determined in step S2, the beam 115A is output in step S3, "NO" is determined in step S2, to which the processing is returned, and the processing ends.

For this reason, in the case where the power device 100 incidentally receives reflected infrared rays from the object 60 other than the marker 50, the processing ends only by outputting the beam 115A once. As a result, useless output of the beam 115A is alleviated.

Figure 8:
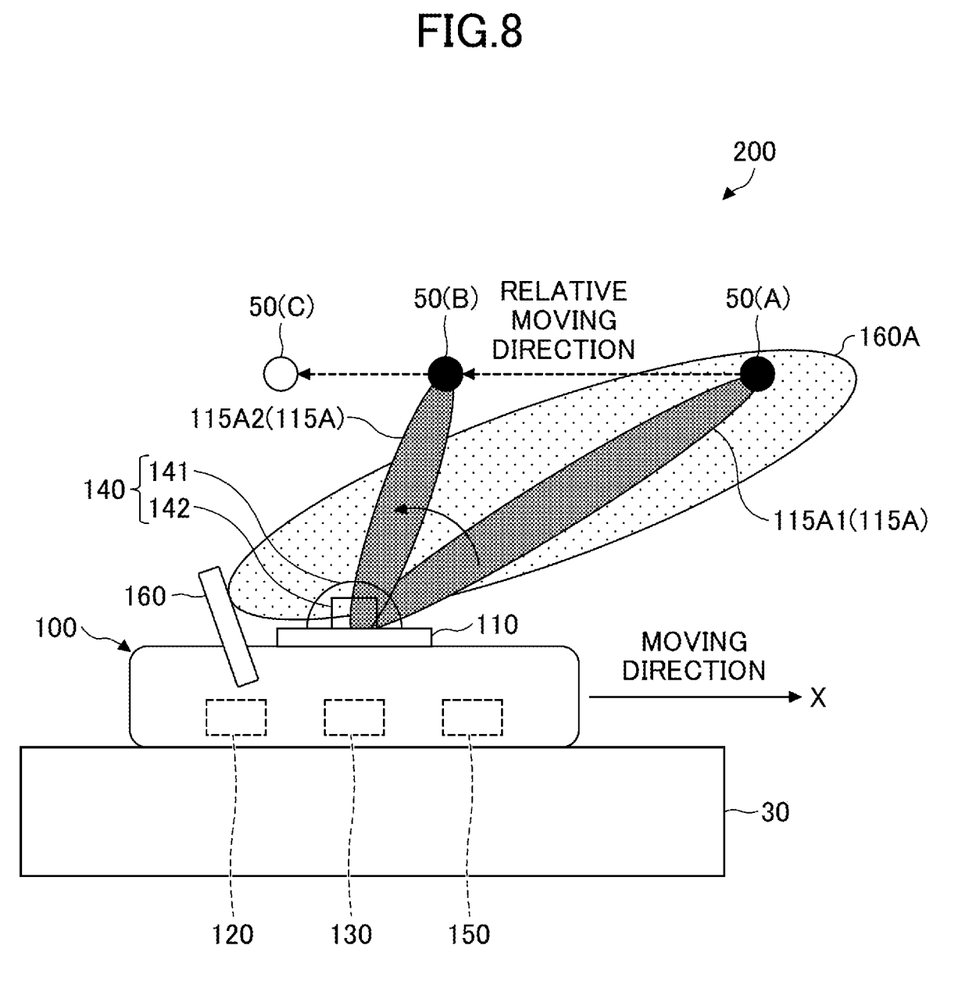
FIG. 8 is a diagram illustrating another example of an operation of a power supply system.

FIG. 8 is a diagram illustrating another example of operation of the power supply system 200. The markers 50 (A), 50 (B), and 50 (C) indicate markers 50 at the positions (A), (B), and (C), respectively, with respect to vehicle 30.

In FIG. 8, the operation from the position (A) to the position (B) are the same as that illustrated in FIG. 5. In FIG. 8, the operation at the position (C) after the position (B) is different from that in FIG. 5.

The power device 100 outputs the beam 115A2 to the marker 50 at the position (B), and the antenna 20 in proximity to the marker 50 receives power.

In this situation, when the control unit 54 of the marker 50 determines that the power received by the antenna 20 and stored in the capacitor is equal to or more than a predetermined amount, the control unit 54 ends the lighting processing of the LEDs 53 without turning on the LED 53B.

For example, when a sensor for monitoring looseness of a bolt and the like of a fixing part performs detection and the control unit 54 determines that there is sufficient power for the wireless communication module to transmit the detection data, it is not necessary to receive any more power, and accordingly, the lighting control of the LEDs 53 is ended. When the lighting control of the LEDs 53 is ended, the power device 100 does not output the beam 115A.

As a result, at the position (C), the marker 50 does not turn on the LED 53. Therefore, when the marker 50 is at the position (C), the power device 100 does not output the beam 115A.

In this manner, when the control unit 54 of the marker 50 ends the lighting processing of the LEDs 53 when the power received by the antenna 20 and stored in the capacitor attains a predetermined amount or higher, the output of the beam 115A and the infrared rays are not performed more than necessary.

Figure 9:
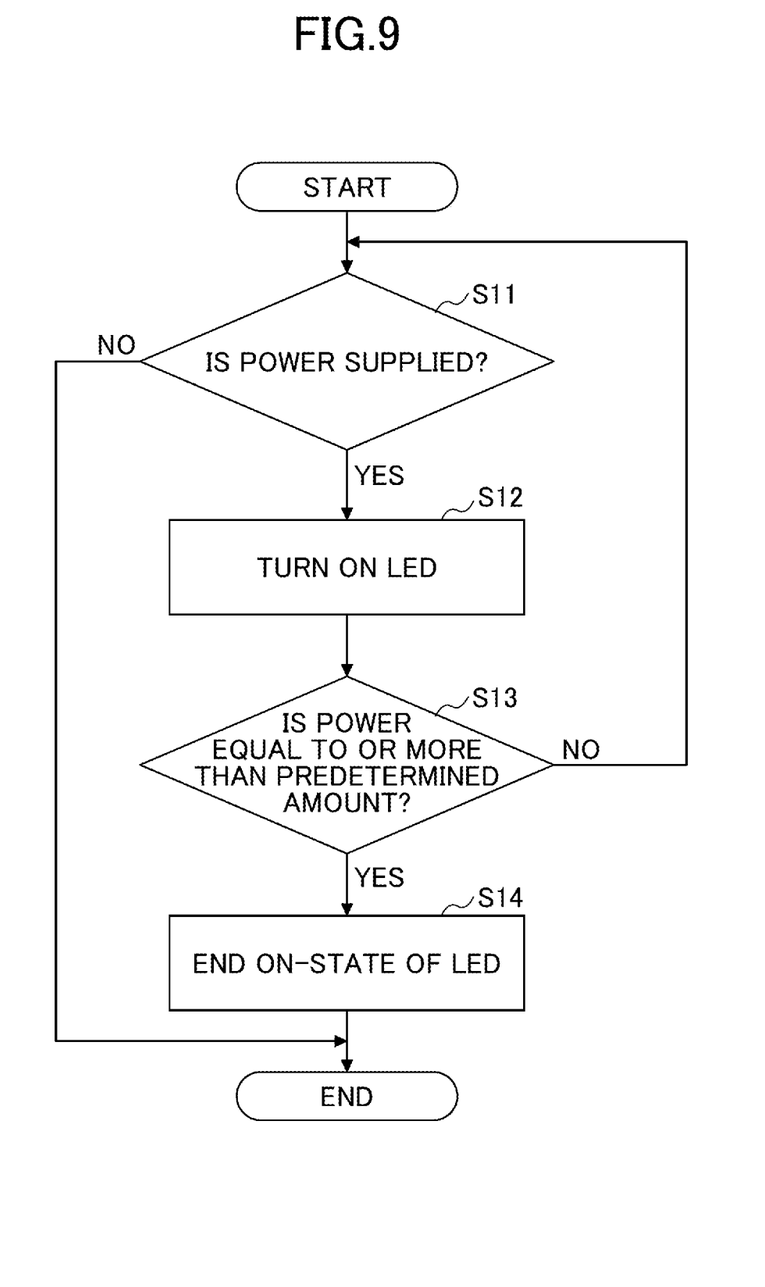
FIG. 9 is a flowchart illustrating processing executed by the control unit of the marker.

FIG. 9 is a flowchart illustrating processing executed by the control unit 54 of the marker 50.

When the processing starts, the control unit 54 determines whether power is supplied from the capacitor (step S11).

When the control unit 54 determines that power is supplied (S11: YES), the control unit 54 turns on the LED 53 (step S12). Each time the flow illustrated in FIG. 9 is repeatedly executed, the next LED among the LEDs 53A to 53G is turned on in step S12.

The control unit 54 determines whether the power stored in the capacitor is equal to or more than a predetermined amount (step S13).

When the control unit 54 determines that power is equal to or more than the predetermined amount (S13: YES), the control unit ends the ON state of the LED 53 (step S14).

Upon completion of the processing in step S14, the control unit 54 ends the series of processing (end).

When the control unit 54 determines in step S13 that the power is not equal to or more than the predetermined amount (S13: NO), the control unit 54 returns the flow to step S11.

Furthermore, when the control unit 54 determines in step S11 that power is not supplied (S11: YES), the control unit 54 ends the series of processes (end).

When the control unit 54 performs the processing illustrated in FIG. 9, the marker 50 is controlled so as not to turn on the LED 53 at the position (C) as illustrated in FIG. 8, and the power device 100 does not output the beam 115A. This corresponds to the case where, in FIG. 9, when the marker 50 is at the positions (A) and (B), "YES" is determined in step S11, step S12 is performed, "NO" is determined in step S13 to return to step S11, and thereafter, when the marker 50 moves to the position (C), "YES" is determined in step S13, and the LED 53 is no longer turned on in step S14.

As explained above, when the power device 100 receives infrared rays (reflected light or infrared rays of the LEDs 53), the power device 100 outputs the beam 115A toward the arrival direction of the infrared rays. When the infrared rays arrive from the marker 50, the power device 100 receives the infrared rays again, and outputs the beam 115A each time the infrared rays are received. As a result, the wireless communication module radiates a signal indicating the output of the sensor, and the signal is received on the side of the vehicle 30, whereby the fixing state of the infrastructural object can be inspected while traveling. In the case where infrared rays arrive from the object 60 other than the marker 50, the object 60 does not receive the power of the beam 115A, and accordingly, the processing ends at that moment.

As explained above, whether the power device 100 outputs the beam 115A for the second and subsequent times depends on whether the object reflecting infrared rays that are initially output by the infrared output unit 160 is the marker 50 or the object 60 other than the marker 50, and whether it is the marker 50 or not is not particularly determined.

Therefore, with a very simple configuration, power can be supplied to the marker 50 by outputting the beam 115A.

Therefore, the power supply system 200, the power device 100, and the power method that are capable of wireless power supply with a simple configuration can be provided.

In addition, by using the marker 50 including the LEDs 53 (53A to 53G) having a narrow directivity, power can be continuously fed to only the marker 50 without determining whether the reflection source is the marker 50.

Since the marker 50 is a passive type that does not have a power source and is driven by the power stored in the capacitor when the antenna 20 receives a beam, a cable or a battery for supplying power is unnecessary, running cost is low, and maintainability is excellent.

Since the marker 50 has the reflector 52 which reflects infrared rays by retroreflection, infrared rays can be reflected toward the infrared output unit 160 of the power device 100. Then, the power device 100 outputs the beam 115A in the direction of the elevation angle θa indicating the direction in which the marker 50, as the reflection source of infrared rays, is present, and the antenna 2 provided in proximity to the marker 50 receives the beam 115A. Therefore, power can be reliably supplied to the marker 50 that relatively moves, and the power supply system 200 with a high degree of reliability can be provided.

Further, since the power device 100 controls, only in the XZ plane, the elevation angle of the beam that is output from the array antenna 110, the number of phase shifters 120 is reduced to ¼ as compared with the case where the elevation angle is controlled in both the XZ plane and the YZ plane. Therefore, the power device 100 can be implemented at a low cost.

In the above explanation, the marker 50 turns on the LEDs 53A to 53G each time power is supplied from the power device 100 to the marker 50 via the antenna 20. When power is supplied from a single antenna 20 to multiple sensors and the wireless communication module sequentially transmits detection data detected by the sensors, the amount of power of the beam 115A with a single output may be determined in accordance with the number of sensors, the number of sensors operating with the beam 115A with a single output, the capacitance of the capacitor, and the like.

In the above explanation, the vehicle 30 moves so as to relatively overtake the marker 50, but the vehicle 30 and the marker 50 may move so as to pass each other. Passing means that, when the vehicle 30 and the marker 50 are moving in opposite directions to each other, the vehicle 30 and the marker 50 are consequently in the opposite arrangement.

In the above explanation, the center of the fisheye lens 141 coincides with the center of the sixteen antenna elements 111. However, the center of the fisheye lens 141 may be shifted in position from the center of the sixteen antenna elements 111. In this case, the origin of the coordinates of the array antenna control phase calculation may be shifted in position in accordance with the shifted position.

Although the case where the power device 100 communicates with the wireless communication module provided on the inner wall 10 of the tunnel has been explained with reference to FIG. 3, the wireless communication module is not limited to being provided on the inner wall 10 of the tunnel, and may be provided at various places. In this way, the power device 100 can be used as a communication device.

Although the power supply system, the power device, and the power method according to the illustrative embodiment of the present invention have been explained, the present invention is not limited to the particulars explained in the embodiment. Various modifications and changes can be made without departing from the subject matter explained in the claims.

This International application claims priority to Japanese Patent Application No. 2020-031361, filed Feb. 27, 2020, the contents of which are incorporated herein by reference in their entirety.

REFERENCE SIGNS LIST 50 marker
52 reflector
53, 53A to 53G LED
100 power device
110 array antenna
110A to 110D subarray
111 antenna element
120 phase shifter
130 microwave generator
140 camera
141 fisheye lens
150 controller
151 position converting unit
152 elevation-angle acquiring unit
153 control unit
160 infrared output unit

The invention claimed is:

1. A power supply system comprising:
a first infrared projector provided on a first object, the first infrared projector having a first directivity configured to output a first infrared ray in a first direction in which a second object that relatively moves with respect to the first object is situated, the first infrared projector being configured to output the first infrared ray;
a reflector provided on the second object, the reflector being configured to reflect the first infrared ray by retroreflection;
a second infrared projector provided on the second object, the second infrared projector having a second directivity configured to output a second infrared ray in a second direction in which the first object that relatively moves is present, the second infrared projector being configured to output the second infrared ray by using power received by wireless power supply; and
a power supply provided on the first object and configured to, when receiving a reflected infrared ray of the first infrared ray reflected by the reflector or when receiving the second infrared ray, output a beam in a direction from which the reflected infrared ray or the second infrared ray originates.

2. The power supply system according to claim 1, further comprising:
an output controller provided on the second object and configured to, when the power received by the wireless power supply is equal to or more than a predetermined amount, cause the second infrared projector to stop outputting the second infrared ray.

3. The power supply system according to claim 1, wherein the second infrared projector includes a plurality of second infrared projectors, each of the plurality of second infrared projectors having a different second directivity directed toward a corresponding one of a plurality of positions of the relatively moving through which the first object relatively moves in a chronological order.

4. The power supply system according to claim 1, wherein the first object and the second object relatively move to perform overtaking or relatively move to pass by each other.

5. The power supply system according to claim 1, wherein the power supply includes:
an array antenna including a plurality of antenna elements arranged in a two-dimensional manner in a first axis and a second axis;
an electromagnetic wave generator;
a phase shifter provided between the array antenna and the electromagnetic wave generator to adjust, in a direction of the first axis, a phase of power supplied from the electromagnetic wave generator to the plurality of antenna elements;
a camera configured to acquire an image through a fisheye lens;
a position converter configured to convert a first position, with respect to the camera, of a marker included in an image acquired by the camera into a second position of a polar coordinate on a first plane including the first axis and the second axis;
an elevation-angle sensor configured to acquire, based on the second position, an elevation angle of a projection position obtained by projecting the first position onto a second plane including the first axis and a third axis, the elevation angle being represented with respect to the third axis in the second plane; and
a controller configured to control the phase shifter such that a direction of the beam radiated by the array antenna attains the elevation angle in the second plane.

6. A power device comprising:
a first infrared projector provided on a first object, the first infrared projector having a first directivity configured to output a first infrared ray in a first direction in which a second object that relatively moves with respect to the first object is situated, the first infrared projector being configured to output the first infrared ray; and
a power supply provided on the first object and configured to, when receiving a reflected infrared ray of the first infrared ray reflected in retroreflection by a reflector provided on the second object or when receiving a second infrared ray that is output by using power received by wireless power supply from a second infrared projector provided on the second object and having a second directivity configured to output the second infrared ray in a second direction in which the first object that relatively moves is situated, output a beam in a direction from which the reflected infrared ray or the second infrared ray originates, wherein the power supply is configured to use image information obtained from the received reflected infrared ray or the received second infrared ray to determine the direction.

7. A power method for a power supply system that includes:
a first infrared projector provided on a first object and having a first directivity configured to output a first infrared ray in a first direction in which a second object that relatively moves with respect to the first object appears, the first infrared projector being configured to output the first infrared ray;
a reflector provided on the second object, the reflector being configured to reflect the first infrared ray by retroreflection; and
a second infrared projector provided on the second object and having a second directivity configured to output a second infrared ray in a second direction in which the first object that relatively moves is present, the second infrared projector being configured to output the second infrared ray by using power received by wireless power supply, the power method comprising:
when receiving, by a side of the first object, a reflected infrared ray of the first infrared ray reflected by the reflector or when receiving, by the side of the first object, the second infrared ray, outputting a beam in a direction from which the reflected infrared ray or the second infrared ray originates.

* * * * *